| United States Patent [19] | [11] | 4,439,482 |
|---|---|---|
| Suematsu | [45] | Mar. 27, 1984 |

[54] PRESSURE-SENSITIVE ADHESIVE TAPE

[75] Inventor: Masakazu Suematsu, Ibaraki, Japan

[73] Assignee: Teijin Limited, Osaka, Japan

[21] Appl. No.: 320,847

[22] Filed: Nov. 12, 1981

[30] Foreign Application Priority Data

Nov. 17, 1980 [JP] Japan .............................. 55-163345[U]

[51] Int. Cl.³ ................................................ B32B 7/00
[52] U.S. Cl. ..................................... 428/252; 57/200;
57/243; 427/208.4; 428/257; 428/258; 428/259;
428/352; 428/354; 428/359; 428/364; 528/294;
528/295
[58] Field of Search ............... 428/343, 352, 354, 287,
428/286, 257–259, 246, 364, 359, 252; 528/295,
294; 57/200, 243

[56] References Cited

U.S. PATENT DOCUMENTS

| 3,018,272 | 1/1962 | Griffing et al. | 528/295 |
|---|---|---|---|
| 3,104,450 | 9/1963 | Christens et al. | 528/295 |
| 4,125,665 | 11/1978 | Bemmels et al. | 428/352 |
| 4,202,925 | 5/1980 | Dabroski | 428/352 |

FOREIGN PATENT DOCUMENTS 2037658  7/1980  United Kingdom ................ 428/352

Primary Examiner—George F. Lesmes
Assistant Examiner—E. Rollins Buffalow
Attorney, Agent, or Firm—Burgess, Ryan & Wayne

[57] ABSTRACT

A base fabric for a pressure-sensitive adhesive tape comprising as the warp a flat yarn of polyester fibers containing a specific residue in the molecular chain. A pressure-sensitive adhesive tape obtained from this base fabric is easy to tear in the crosswise direction and has a smooth torn edge.

9 Claims, No Drawings

PRESSURE-SENSITIVE ADHESIVE TAPE

BACKGROUND OF THE INVENTION

1. Field of the Invention

The invention relates to a base fabric for a pressure-sensitive adhesive tape. Particularly, the invention relates to a base fabric for a pressure-sensitive adhesive tape which is made of polyester fibers not widely used hitherto in the art and is easy to tear and capable of providing a smooth torn edge when it is torn.

2. Description of the Prior Art

Recently, pressure-sensitive adhesive tapes are widely used for binding packages. One requisite for such a pressure-sensitive adhesive tape is that the tape has an ultimate elongation of from 10 to 15% in its lengthwise direction. When the ultimate elongation is more than 15%, the resultant tape is difficult to tear. In such a case, if the tape is forcibly torn, the torn edge becomes rough.

Conventional base fabrics for a pressure-sensitive adhesive tape which have heretofore been proposed are those in which a rayon spun yarn or a polyvinyl alcohol fiber yarn is used for the warp and the weft. Both of these fabrics fulfill the above-mentioned elongation requirement.

However, the base fabric made of the former spun yarn has disadvantages in that the fabric has a wet strength as low as from 45 to 55% of the dry strength, the thickness is uneven, the surface is not flat, and the fabric has an adhesive resin deposited on its surface in an excessive amount. On the other hand, the base fabric made of the latter yarn has drawbacks in that the employed raw material is expensive, the production process of the raw yarn is complicated, and the fabric has a wet strength as low as from 70 to 80% of the dry strength.

In order to resolve these drawbacks, there is proposed, in Japanese Laid-open Patent Specification No. 50-71570, a basic fabric for a pressure-sensitive adhesive tape consisting of a polyester fabric, in which a multifilament yarn with no twist (hereinafter, referred to as a flat yarn) of not more than 40 denier is employed as the warp, a low shrinkable flat yarn of a fineness of three times or more the fineness of the warp is employed as the weft, and the weft density is not less than 7 yarns/cm. In this fabric, in order to make it easy to cut the warp yarn, the fineness of the warp yarn is limited to not more than 40 denier and, in addition, a yarn with no twist is employed as the warp. The low shrinkable flat yarn is employed as the weft to avoid the dimensional change of the resulting adhesive tape which may often occur at the time of drying the fabric for the removal of a solvent after the coating of the adhesive. However, this base fabric still has drawbacks in that the thickness is uneven, the surface is not flat, and the adhesive is liable to be deposited unevenly on the surface.

Further, in Japanese Laid-open Patent Specification No. 52-58067, here is disclosed a substrate for a pressure-sensitive adhesive tape composed of a woven fabric having a yarn of a fineness of less than 0.3 mm as the warp and a yarn of a fineness of not less than 0.3 mm as the weft. In the example of this prior art, a fabric having an ultimate elongation of 49 to 62% in the warp direction is employed as the substrate for an adhesive tape. However, the adhesive tape resulting from a fabric having such a high elongation is difficult to tear, so that the torn edge becomes undesirably rough and frayed. In addition, since the fabric has a difference in the fineness between the warp and weft, the fabric has drawbacks similar to those as above-mentioned with respect to the fabric of Japanese Laid-open Patent Specification No. 50-71570.

SUMMARY OF THE INVENTION

It has now been found that the above-mentioned drawbacks can entirely be overcome by using a yarn of specific polyester fibers as the warp of a base fabric for a pressure-sensitive adhesive tape.

The specific polyester fiber yarn usable for the present invention is a yarn of polyester fibers which can maintain a tensile strength-elongation, both a strength and an elongation, satisfactory to be woven into a fabric during the weaving and can provide a fabric capable of maintaining a tearing strength and elongation sufficient to be easily torn and capable of providing a smooth torn edge when the pressure-sensitive adhesive tape is torn. More particularly, it is necessary that the yarn possesses a tensile strength-elongation sufficient to withstand the tension loaded on the yarn during the weaving, which is generally said to be a strength of more than about 2 g/d and an elongation of more than about 20% in both the warp and the weft. On the other hand, for the strength-elongation required for a pressure-sensitive adhesive tape, the strength in the weft direction should be not less than 15 kg/25 mm width, as measured by the method of JIS (Japanese Industrial Standard) Z 1524, and the elongation should be in a range from 10 to 15%. The tape should have a tearing strength of not more than 400 g as measured by the method of JIS L 1096.

To produce a pressure-sensitive adhesive tape from a base fabric, a resin layer is placed on at least one of the two surfaces of a plane-woven base fabric and heated to dry, and thereafter, a releasing agent is applied to one surface and an adhesive to the other surface.

The present invention is based on the discovery that an excellent base fabric for a pressure-sensitive adhesive tape can be obtained if a yarn of polyester fibers, the strength-elongation of which can be changed to a value required of the warp of a pressure-sensitive adhesive tape at the time of the heat treatment in the process of the production of the adhesive tape, is used for the warp of the base fabric. It has now been found that the strength of the specific polyester fibers as used in the present invention is reduced somewhat, but not greatly, as occurs similarly in ordinary polyester fibers, by the heat treatment in the process of the production of a pressure-sensitive sensitive adhesive tape, but surprisingly, the elongation of the specific polyester fibers is greatly lowered by the heat treatment.

DESCRIPTION OF THE PREFERRED EMBODIMENTS

The ordinary polyester fiber as used herein includes typically fibers of polyesters having terephthalic acid as the acid component and at least one glycol selected from alkylene glycols of 2 to 6 carbon atoms, i.e. ethylene glycol, trimethylene glycol, tetramethylene glycol, pentamethylene glycol and hexamethylene glycol, preferably ethylene glycol as the glycol component. In the polyesters, the terephthalic acid component may be partially replaced by another bifunctional carboxylic acid component and/or a part of the glycol component may be replaced by a diol component other than those mentioned above.

The bifunctional carboxylic acids other than terephthalic acid include aromatic, aliphatic and alicyclic bifunctional carboxylic acids, such as isophthalic acid, naphthalenedicarboxylic acid, diphenyldicarboxylic acid, diphenoxyethanedicarboxylic acid, β-hydroxyethoxybenzoic acid, p-hydroxybenzoic acid, adipic acid, sebacic acid and 1,4-cyclohexanedicarboxylic acid. The diol compounds other than the above-mentioned glycols include aliphatic, alicyclic and aromatic diol compounds, such as cyclohexane-1,4-dimethanol, neopentyl glycol, bisphenol A and bisphenol S.

The specific polyester fibers usable for the present invention contain a residue of the following formula in the molecular chain.

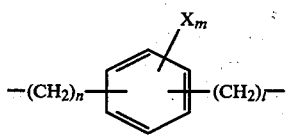

in which X is —SO$_3$Na, —X', —OR, —R' or —OAr, X' is halogen, R and R' are independently alkyl, Ar is an aromatic radical which may optionally be substituted, m is 1 to 3, n and l are independently 0 to 2, and the bonding positions of the —(CH$_2$)$_n$— and —(CH$_2$)$_l$— may be ortho-, meta- or para-positions. Moreover, the specific polyester may contain a residue of the above-mentioned adipic acid, sebacic acid, neopentyl glycol, bisphenol A, bisphenol S, diphenoxyethanedicarboxylic acid and p-hydroxybenzoic acid. The specific polyester fiber may be produced by copolymerizing or by blending the specific polyester containing a residue of the above-defined formula with an ordinary polyester. The specific polyester may contain such a residue in an amount ranging from 1 to 30% by weight.

In the present invention, it is necessary to use, as at least the warp, a flat yarn of a polyester containing a specific residue of the above-defined formula. As the weft, a flat yarn of an ordinary polyester may be employed or a flat yarn of a polyester of the same type as the warp, containing a specific residue.

The fineness of the warp or the weft is not critical, but it may preferably be 50 to 100 denier. It is preferred to employ the warp and the weft of the same denier. The monofilament denier of the warp or the weft is not also critical, but it may preferably be 1 to 5 denier. The warp density of the base fabric may vary, depending upon the fineness of the warp and the surface smoothness required of the resulting adhesive tape.

The resin layer may be applied to one or both surfaces of the base fabric. For the resin layer, there may be employed polyolefins, such as polyethylene and polypropylene, vinyl resins, such as soft polyvinyl chloride and polyvinyl acetate and the like. The resin layer may be applied in any conventional manner, e.g. by laminating, as a thin film, or by coating or spraying, as a solution in a suitable solvent.

The base fabric having the resin layer applied is then heat treated at a temperature in a range from 250° to 350° C. Preferably, the heat treatment is carried out for 0.5 to 5 sec. The heat treatment may be effected by means of a hot plate or hot roller. By this heat treatment, the elongation of the yarn of polyester fibers containing a specific residue, as defined above, is greatly lowered. In the case where the temperature of the heat treatment is lower than 250° C., a desired elongation can not be obtained in the resulting adhesive tape by a continuous heat treatment. If the temperature is higher than 350° C., the resulting tape may have drawbacks in that the strength and elongation will be too low, and the resin layer will be deformed or foamed. If the heat treatment time is less than 0.5 sec., the heat treatment may be insufficient, and if the heat treatment time is more than 5 sec., thermal degradation may occur.

As the releasing agent and the adhesive, any conventional releasing agents and adhesives common to pressure-sensitive adhesive tapes may be employed.

The pressure-sensitive adhesive tape having the constitution as mentioned hereinabove has the following advantages.

1. The cost is low because the tape can be composed entirely of polyester.
2. No reduction in the wet strength occurs.
3. The thickness is even, the surface is smooth, and the amount of the adhesive to be used is small.
4. Particularly, it is easy to tear in the crosswise direction and the resulting torn edge is smooth.

The present invention will be further illustrated by the following non-limitative examples.

EXAMPLE 1

A base fabric was prepared by mix-weaving using a flat yarn of 75 denier/24 filaments (having a strength of 3.8 g/d and an elongation of 31%) of a modified polyethylene terephthalate having 2 mole% of 5-sodium-sulfoisophthalic acid as the warp and a flat yarn of 75 denier/36 filaments (having a strength of 5.1 g/d and an elongation of 30%) of polyethylene terephthalate as the weft. The fabric had a warp density of 53 yarns/in. and a weft density of 64 yarns/in. The ultimate elongation in the lengthwise direction of the fabric was about 26% and the fabric could not be torn by hand.

A polyethylene film having a thickness of 40 μm was laminated with the base fabric by applying the film onto the front surface of the fabric and subjecting them to heat treatment at 315° C. for 2 sec. The ultimate elongation in the lengthwise direction of the laminated fabric was reduced to about 13%. Thus, the laminate could be easily torn by hand and the torn edge was very smooth.

Then, the laminated fabric was coated with a releasing agent on its front surface and with an acrylic resin type adhesive on its back surface to obtain a pressure-sensitive adhesive tape. The resultant adhesive tape had a tearing strength of 270 g in the crosswise direction, while the tearing strength in the crosswise direction of the base fabric was 1080 g, as measured by the method of JIS L 1096.

EXAMPLE 2

A pressure-sensitive adhesive tape was prepared by repeating the procedure in Example 1, except that the same flat yarn as that used as the warp in Example 1 was also used as the weft. The resultant adhesive tape exhibited the same tearing strength in the crosswise direction as that in Example 1 and the torn edge of the resultant tape was very smooth. Further, the tape exhibited the same tearing strength in the lengthwise direction as that in the crosswise direction.

EXAMPLES 3 THROUGH 10, COMPARATIVE EXAMPLE 1

A pressure-sensitive adhesive tape was prepared as in Example 1, using as the warp a flat yarn of polyethylene terephthalate having copolymerized a specific residue as shown in Table 1 instead of 5-sodium-sulfoisophthalic acid. The properties of the resultant intermediate base fabric and adhesive tape are shown in Table 1.

EXAMPLES 11 AND 12, COMPARATIVE EXAMPLES 2 AND 3

The procedure as in Example 1 was repeated by vary-

TABLE 1

| Example No. | Residue | Yarn in Base Fabric Strength (g/d) Warp | Weft | Elongation (%) Warp | Weft | Adhesive Tape Strength (kg/25 mm width) Warp | Weft | Elongation (%) Warp | Weft | Tearing Strength (g) Warp |
| --- | --- | --- | --- | --- | --- | --- | --- | --- | --- | --- |
| 3 | CH₂—⬡—CH₂— | 3.7 | 5.2 | 30 | 30 | 15.5 | 22.5 | 13 | 25 | 270 |
| 4 | —CH₂—⬡(SO₃Na)—CH₂— | 3.5 | 5.2 | 32 | 30 | 16 | 22.5 | 11 | 25 | 215 |
| 5 | —CH₂—⬡(O-phenyl)—CH₂— | 3.0 | 5.2 | 38 | 30 | 15 | 22.5 | 10 | 25 | 230 |
| 6 | dimethyl-Cl-phenyl | 3.5 | 5.2 | 34 | 30 | 19 | 22.5 | 15 | 25 | 260 |
| 7 | dimethyl-OCH₂CH₃-phenyl | 3.4 | 5.2 | 32 | 30 | 18 | 22.5 | 14.5 | 25 | 255 |
| 8 | dimethyl-CH₂CH₂CH₃-cyclohexyl | 3.9 | 5.2 | 39 | 30 | 22 | 22.5 | 15 | 25 | 330 |
| 9 | trimethyl-phenyl (CH₃) | 3.9 | 5.2 | 37 | 30 | 20 | 22.5 | 15 | 25 | 335 |
| 10 | dimethyl-CH₂CH₃-phenyl | 3.8 | 5.2 | 34 | 30 | 18 | 22.5 | 15 | 25 | 320 |
| Comparative 1 | None | 5.2 | 5.2 | 30 | 30 | 22.5 | 22.5 | 24 | 25 | 425 | ing the heat treatment conditions. The properties of the intermediate base fabric and the resultant adhesive tape are shown in Table 2.

TABLE 2

| Example No. | Heat Treatment Temperature (°C.) | Time (sec) | Yarn in Base Fabric Strength (g/d) Warp | Weft | Elongation (%) Warp | Weft | Adhesive Tape Strength (kg/25 mm width) Warp | Weft | Elongation (%) Warp | Weft | Tearing Strength (g) |
| --- | --- | --- | --- | --- | --- | --- | --- | --- | --- | --- | --- |
| 1 | 315 | 2 | 3.8 | 5.1 | 31 | 30 | 16.5 | 22.5 | 13 | 25 | 270 |
| 11 | 250 | 5 | 3.8 | 5.1 | 31 | 30 | 18 | 23 | 15 | 26 | 252 |
| 12 | 350 | 1 | 3.8 | 5.1 | 31 | 30 | 15 | 20 | 11 | 25 | 213 |
| Comparative 2 | 230 | 5 | 3.8 | 5.1 | 31 | 30 | 21 | 25 | 19 | 28 | 315 |
| Comparative 3 | 370 | 1 | 3.8 | 5.1 | 31 | 30 | 10 | 12 | 7 | 9 | 151 |

TABLE 2-continued

| Example No. | Heat Treatment Temperature (°C.) | Time (sec) | Yarn in Base Fabric | | | | Adhesive Tape | | | | Tearing Strength (g) |
|---|---|---|---|---|---|---|---|---|---|---|---|
| | | | Strength (g/d) | | Elongation (%) | | Strength (kg/25 mm width) | | Elongation (%) | | |
| | | | Warp | Weft | Warp | Weft | Warp | Weft | Warp | Weft | |
| ative 3 | | | | | | | | | | | |

I claim:

1. A pressure-sensitive adhesive tape having an ultimate elongation in the lengthwise direction of 10–15% comprising:

(A) a base woven fabric which comprises as the warp a flat yarn of polyester fibers containing a residue of the following formula in the molecular chain:

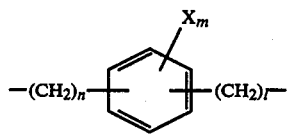

in which X is —SO$_3$Na, —X', —OR, —R' or —OAr, X' is halogen, R and R' are independently alkyl, Ar is an aromatic radical which may optionally be substituted, m is 1 to 3, n and l are independently 0 to 2, and the bonding positions of the —(CH$_2$)$_n$— and —(CH$_2$)$_l$— may be ortho-, meta- or para-positions;

(B) a resin layer laminated to at least one side of said base fabric without an intermediate adhesive layer to form a laminate;

(C) a releasing agent on one surface of said laminate; and (D) an adhesive on the other surface of said laminate; wherein said yarn has a tensile strength of greater than about 2 g/d and an elongation of greater than about 20% and having a strength in the weft direction of at least 15 Kg/25 mm width also having a tearing strength of no more than 400 g.

2. A pressure-sensitive adhesive tape according to claim 1, wherein said residue is contained in an amount of 1 to 30% by weight.

3. A pressure-sensitive adhesive tape according to claim 1, wherein the weft is composed of ordinary polyester fibers.

4. A pressure-sensitive adhesive tape according to claim 1, wherein the weft is composed of polyester fibers of the same type as that of the warp.

5. A pressure-sensitive adhesive tape according to claim 1, wherein the warp and the weft have independently a fineness of 50 to 100 denier.

6. A pressure-sensitive adhesive tape according to claim 5, wherein the warp and the weft have the same fineness.

7. A process for preparing a pressure-sensitive adhesive tape comprising applying a resin layer onto a base fabric according to claim 1, heat treating the base fabric having the resin layer applied at a temperature of from 250° to 350° C. for several tenths of a second to several seconds, and then applying a releasing agent onto one surface of said treated fabric and an adhesive onto the other surface.

8. A process according to claim 7, wherein the heat treatment is carried out for 0.5 to 5 seconds.

9. A process according to claim 7, wherein the resin layer is applied onto the base fabric by laminating as a thin film or by coating or spraying as a solution in a suitable solvent.

* * * * *